(12) United States Patent
Adams

(10) Patent No.: US 11,407,070 B2
(45) Date of Patent: Aug. 9, 2022

(54) BONNET AND VALVE TRIM ASSEMBLY AND RELATED METHODS

(71) Applicant: FISHER CONTROLS INTERNATIONAL LLC, Marshalltown, IA (US)

(72) Inventor: Daniel M. Adams, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 17/121,273

(22) Filed: Dec. 14, 2020

(65) Prior Publication Data
US 2022/0184755 A1   Jun. 16, 2022

(51) Int. Cl.
| | |
|---|---|
| F16K 27/04 | (2006.01) |
| F16K 47/08 | (2006.01) |
| B23P 15/00 | (2006.01) |
| F16K 1/36 | (2006.01) |
| F16K 1/46 | (2006.01) |
| F16K 1/42 | (2006.01) |
| F16K 41/02 | (2006.01) |

(52) U.S. Cl.
CPC .............. *B23P 15/001* (2013.01); *F16K 1/36* (2013.01); *F16K 1/42* (2013.01); *F16K 1/465* (2013.01); *F16K 27/041* (2013.01); *F16K 47/08* (2013.01); *F16K 41/02* (2013.01)

(58) Field of Classification Search
CPC ... F16K 1/36; F16K 1/42; F16K 1/465; F16K 27/041; F16K 41/02; F16K 27/02; F16K 3/246; F16K 47/08; B23P 15/001; Y10T 137/6011; Y10T 137/7668
See application file for complete search history.

(56) References Cited

U.S. PATENT DOCUMENTS

| | | | | |
|---|---|---|---|---|
| 11,041,573 | B2* | 6/2021 | Hostetter | F16K 27/02 |
| 2010/0307610 | A1* | 12/2010 | Wears | F16K 3/246 |
| | | | | 137/454.6 |
| 2017/0299066 | A1* | 10/2017 | Hamberger | F16K 27/02 |
| 2018/0216745 | A1 | 8/2018 | Gabriel et al. | |
| 2020/0325996 | A1* | 10/2020 | Hostetter | F16K 1/427 |
| 2020/0355289 | A1* | 11/2020 | Hostetter | F16K 3/246 |

FOREIGN PATENT DOCUMENTS

DE   2602577 A1 *   7/1977   ............. F16K 27/02

* cited by examiner

*Primary Examiner* — Marina A Tietjen
(74) *Attorney, Agent, or Firm* — Hanley, Flight & Zimmerman, LLC

(57) ABSTRACT

Bonnet and valve trim assembly and related methods are described. An example bonnet and valve trim assembly includes a bonnet structured to couple to a valve body via a valve body mounting flange, the bonnet including a cage mounting interface. A cage defining a body has a bonnet mounting interface to couple to the cage mounting interface of the bonnet. A retainer retains the cage mounting interface and the bonnet mounting interface to couple the cage and the bonnet. The retainer to enable axial movement between the cage and the bonnet when the retainer is coupled to the cage and the bonnet.

24 Claims, 11 Drawing Sheets

BONNET AND VALVE TRIM ASSEMBLY AND RELATED METHODS

FIELD OF THE DISCLOSURE

This disclosure relates generally to fluid valves and, more particularly, to bonnet and valve trim assembly and related methods.

BACKGROUND

Control valves are often used in industrial processes such as, for example, oil and gas pipeline distribution systems and chemical processing plants to control the flow of process fluids. Control valves often employ valve trim including a cage to control fluid flow characteristics of the valve.

SUMMARY

An example bonnet and valve trim assembly includes a bonnet structured to couple to a valve body via a valve body mounting flange, the bonnet including a cage mounting interface. A cage defining a body has a bonnet mounting interface to couple to the cage mounting interface of the bonnet. A retainer retains the cage mounting interface and the bonnet mounting interface to couple the cage and the bonnet. The retainer to enable axial movement between the cage and the bonnet when the retainer is coupled to the cage and the bonnet.

In another example, an example bonnet and valve trim assembly includes a bonnet having first tabs radially spaced relative to a longitudinal axis of the bonnet. A cage has second tabs radially spaced relative to a longitudinal axis of the cage. The first tabs are to intermesh with the second tabs when the cage is coupled to the bonnet. A fastener is to couple the first tabs and the second tabs to retain the cage coupled to the bonnet.

In yet another example, an example method includes obtaining a bonnet with a cage mounting flange; obtaining a cage with a bonnet mounting flange; and coupling the bonnet and the cage via a retainer by inserting the retainer in a passageway defined by the cage mounting flange and the bonnet mounting flange.

DETAILED DESCRIPTION

Figure 1:
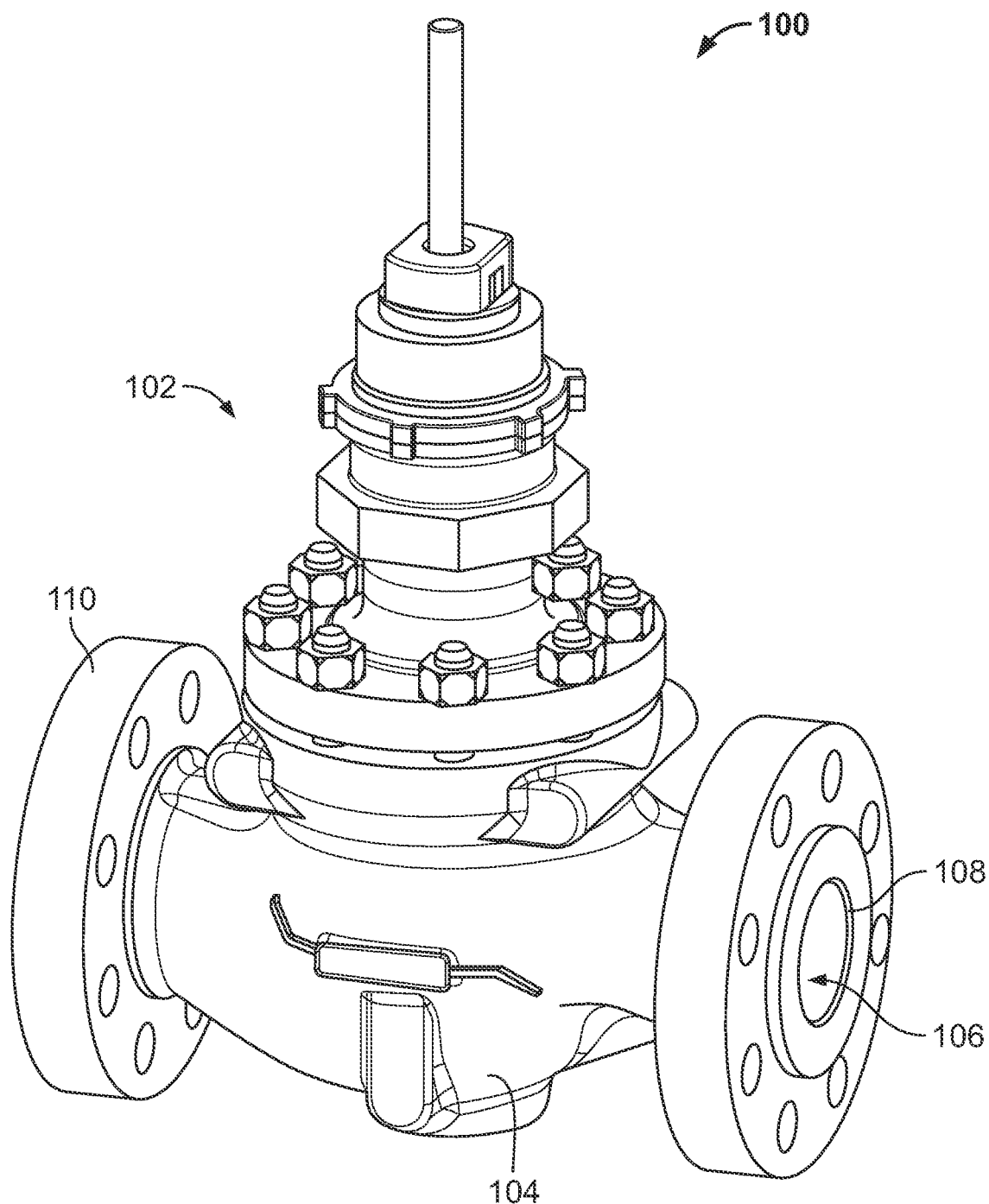
FIG. 1 is a perspective view of an example control valve having a bonnet and valve trim assembly in accordance with teachings of this disclosure.

Control valves employ valve trim to provide various fluid flow characteristics. Different valve trim can be selected to affect how a capacity of a control valve changes as a flow control member of the valve moves through a complete stroke or travel. Thus, different valve trim can be employed to meet a variety of control application needs and/or flow characteristics.

Conventional control valves include numerous valve trim components that are individually inserted into a body of a valve during a valve assembly process. Examples of such trim components may include a seat ring, a seat ring gasket, a cage, a plug, a spiral wound gasket, a shim gasket, a bonnet gasket and a bonnet, among other trim components. Proper loading and/or assembly of such individual trim components is a complex process that gives rise to manufacturing and/or assembly complexities or concerns, particularly when a relatively large number of trim components are to be inserted and assembled into the valve body. For example, tolerance stack-ups must be accounted for during the manufacturing of the trim components and the subsequent assembly thereof to ensure that the trim components fit properly within and/or are positioned properly within the assembled control valve. Proper alignment of the trim parts is required to ensure proper seating of the valve plug in the seat ring to achieve shut-off of the fluid flow through the valve. Furthermore, each trim component is a serviceable component that may require repair and/or replacement upon failure of the component. Thus, as the number of trim components to be assembled into the body of the valve increases, so too does the possibility that at least one serviceable component of the valve will require servicing during the lifetime of the valve. Additionally, different valve trim apparatus are often needed to achieve different fluid flow characteristics, which increases manufacturing costs and/or assembly costs. For example, technicians have to disassemble a valve and reassemble with the different trim components to achieve different flow characteristics.

Example bonnet and valve trim assemblies and related methods disclosed herein facilitate assembly, disassembly and/or serviceability of a fluid valve. Example bonnet and valve trim assemblies disclosed herein include a bonnet, a cage and a seat that are coupled together via a bonnet/cage interface. In some examples, the bonnet and valve trim assemblies and related methods disclosed herein provide an example cartridge, which facilitates removal and/or coupling of the bonnet and valve trim assemblies disclosed herein with a valve body of a fluid valve. In other words, the bonnet and valve trim assemblies disclosed herein provide a cartridge that enables substantially simultaneous removal and/or coupling of a valve trim assembly (e.g., valve trim components) with a valve body. For example, a bonnet and a valve trim assembly disclosed herein can couple to a valve body as a single unit or an assembly. Additionally, an example bonnet/cage interface disclosed herein can be structured to enable axial movement (e.g., expansion and/or contraction) in a longitudinal direction (e.g., in a direction of stroke) to account for thermal expansion during operation. For example, some example valve trim cartridges disclosed herein employ enlarged openings (e.g., oval shaped openings) and/or a spring or gasket (e.g., a spiral wound gasket) that allows thermal expansion between a cage and a bonnet.

FIG. 1 is perspective view of an example fluid valve 100 having a bonnet and valve trim assembly 102 constructed in accordance with teachings of this disclosure. The fluid valve 100 of the illustrated example can be employed with various industrial processes (e.g., petrochemical applications, subsea applications, paper and pulp applications, etc.), high pressure differential and/or temperature applications, and/or any other application(s) requiring fluid flow control. The bonnet and valve trim assembly 102 of the illustrated example couples to a valve body 104 of the fluid valve 100. An actuator couples to the valve body 104 via the bonnet and valve trim assembly 102 to control fluid flow through a fluid flow passageway 106 between an inlet 108 and an outlet 110 of the valve body 104. The actuator can be a pneumatic actuator (e.g., a diaphragm, a piston), a bellows actuator, an electric actuator, and/or any other actuator.

Figure 2:
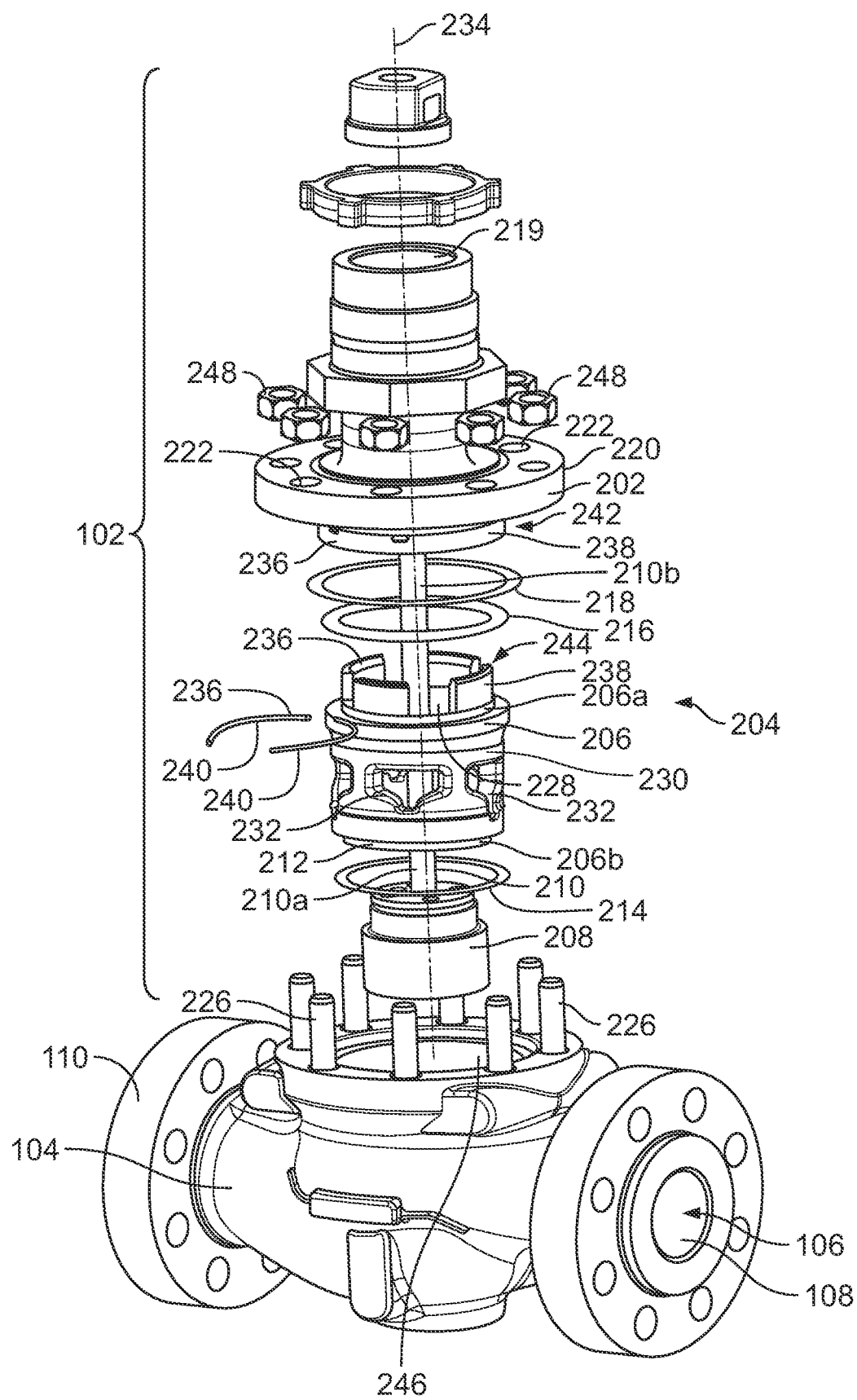
FIG. 2 is an exploded view of the example control valve of FIG. 1.

FIG. 2 is an exploded view of the fluid valve 100 of FIG. 1. The bonnet and valve trim assembly 102 of the illustrated example includes a bonnet 202 and a valve trim assembly 204. The valve trim assembly 204 of the illustrated example includes a cage 206, a flow control member 208 (e.g., a valve plug), a valve stem 210, and a valve seat 212. The valve seat 212 of the illustrated example is formed with the cage 206 as a single piece (e.g., unitary) structure. However, in some examples, the valve seat 212 can removably couple to the cage 206 and/or can be coupled to the cage 206 and/or the bonnet 202 via one or more fasteners, retaining rings, clamps, etc. The valve trim assembly 204 of the illustrated example includes a cage/valve body seal 214, a cage/bonnet seal 216, and a bonnet/valve body seal 218. However, in some examples, the valve trim assembly 204 does not include the cage/valve body seal 214, the cage/bonnet seal 216, and/or the bonnet/valve body seal 218. The cage/valve body seal 214, the cage/bonnet seal 216, and/or the bonnet/valve body seal 218 can be a spring seal, an O-ring, a gasket, a spiral wound gasket, and/or any other seal. The cage/valve body seal 214 provides a seal between the cage 206 (e.g., an outer surface of the valve seat 212) and the valve body 104, the cage/bonnet seal 216 provides a seal between the cage 206 and the bonnet 202, and the bonnet/valve body seal 218 provides a seal between the bonnet 202 and the valve body 104.

The bonnet 202 of the illustrated example includes a valve stem opening 219 and a mounting flange 220. The valve stem opening 219 receives (e.g., slidably receives) the valve stem 210 and the mounting flange 220 couples (e.g., attaches) the bonnet 202 and the valve body 104. The valve mounting flange 220 has apertures 222 to receive respective ones of fasteners 226 (e.g., shanks of studs) supported by the valve body 104. In some examples, the bonnet 202 can include the fasteners 226 and the valve body 104 can include the apertures 224.

The valve stem 210 has a first end 210a that is attached to the flow control member 208 and a second end 210b that protrudes from the bonnet 202 to couple (e.g., attach) to an actuator to move the flow control member 208 relative to the valve seat 212. For example, the cage 206 defines a central bore 228 to slidably receive the flow control member 208. Specifically, the flow control member 208 slides within the central bore 228 of the cage 206 relative to the valve seat 212 to control fluid flow through the fluid flow passageway 106. The central bore 228 extends between a first end 206a of the cage 206 and a second end 206b of the cage 206 opposite the first end 206a. The cage 206 of the illustrated example has a cylindrical body. The cage 206 includes a plurality of opening 232 (e.g., windows or passageways) through a side surface 230 of the cage 206 that are radially spaced relative to a longitudinal axis 234.

To retain the bonnet and valve trim assembly 102 as a unit (e.g., a subassembly), the bonnet and valve trim assembly 102 of the illustrated example includes a retainer assembly 236. The retainer assembly 236 of the illustrated example includes a retainer interface 238 and a retainer 240. The retainer interface 238 is defined by the bonnet 202 and the cage 206 and the retainer 240 couples (e.g., attaches or secures) to the retainer interface 238 to couple the bonnet 202 and the cage 206. The retainer interface 238 of the illustrated example includes a cage mounting interface 242 and a bonnet mounting interface 244. In particular, the cage mounting interface 242 is carried by the bonnet 202 and the bonnet mounting interface 244 is carried by the cage 206.

The valve body 104 includes a valve body bore 246 to receive the valve trim assembly 204. The valve body bore 246 has a longitudinal axis that is non-parallel (e.g., perpendicular) to the inlet 108 and/or the outlet 110 of the valve body 104. In other words, the valve body bore 246 aligns (e.g., coaxially aligns) with the longitudinal axis 234 of the valve stem 210 and/or the valve stem opening 219 of the bonnet 202. In this manner, when coupled to the valve body 104, the bonnet 202 positions the valve trim assembly 204 in the fluid flow passageway 106 via the valve body bore 246. The bonnet and valve trim assembly 102 couples to the valve body 104 by aligning the fasteners 226 with respective ones of the apertures 222. Because the valve trim assembly 204 is retained to the bonnet 202 via the retainer assembly 236, coupling the bonnet 202 to the valve body 104 causes the valve trim assembly 204 (e.g., the cage 206, the valve seat 212 and/or the flow control member 208) to position in the fluid flow passageway 106 of the valve body 104 (e.g., via the valve body bore 246). After the bonnet 202 is coupled to the valve body 104, the fasteners passing through apertures 222 of the mounting flange 220 of the bonnet 202 can be torqued via nuts 248 to apply or adjust (e.g., increase or decrease) a loading or clamping to the cage 206 and the valve seat 212 when the cage 206 and the valve seat 212 are positioned in the fluid flow passageway 106.

Figure 3:
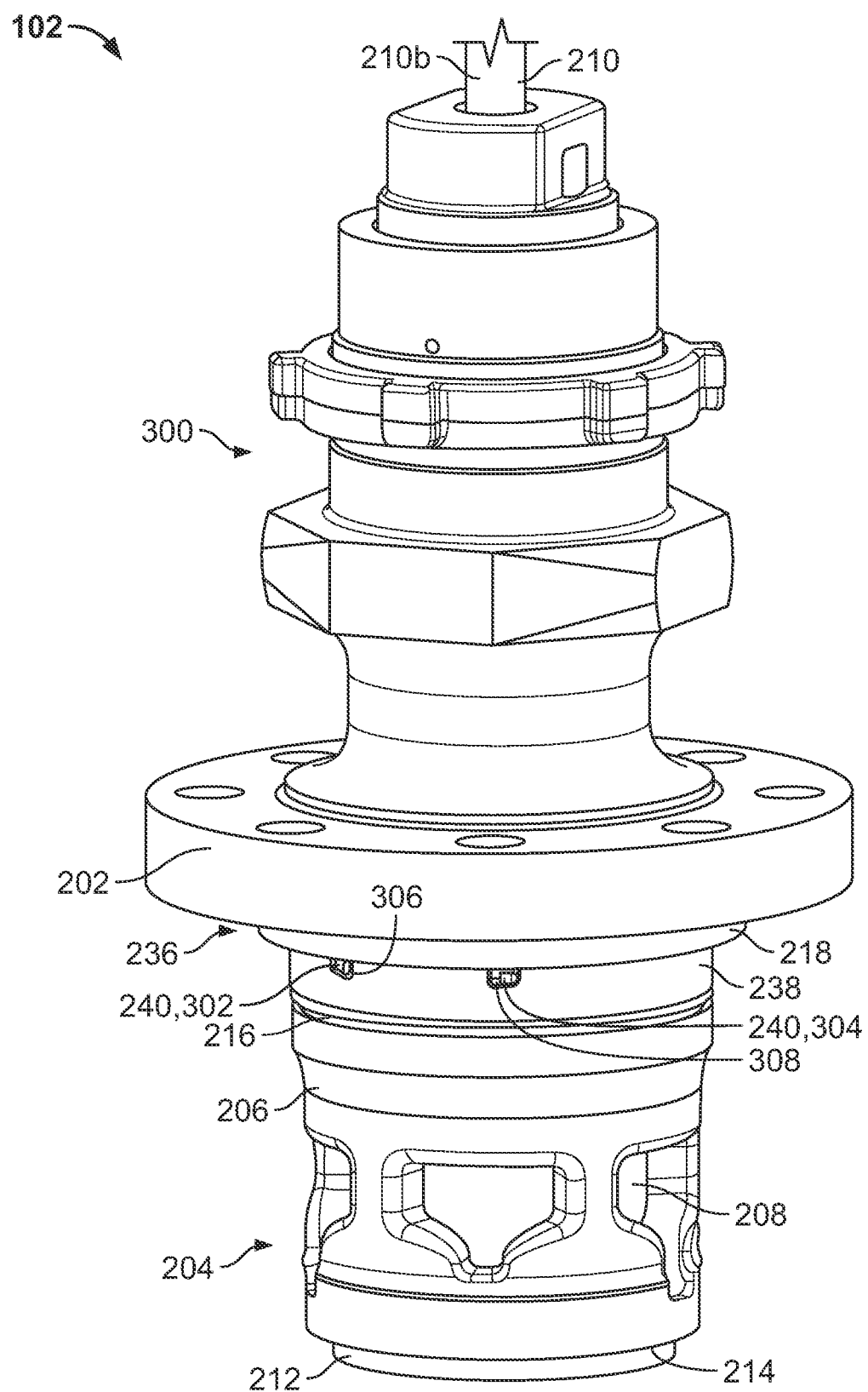
FIG. 3 is a perspective view of an example cartridge of the example bonnet and valve trim assembly of FIGS. 1-2.

FIG. 3 is a perspective view of the bonnet and valve trim assembly 102 of FIGS. 1 and 2. As noted above, the bonnet and valve trim assembly 102 defines or forms a cartridge 300 (e.g., a subassembly) to facilitate removal and/or assembly of the valve trim assembly 204 and the valve body 104. The cartridge 300 of the illustrated example includes the bonnet 202, the cage 206, the flow control member 208, the valve stem 210, the valve seat 212, the cage/valve body seal 214 (FIG. 2), the cage/bonnet seal 216, the bonnet/valve body seal 218, and the retainer assembly 236. In some examples, the cartridge 300 of the illustrated example can include other components of a valve trim assembly.

The retainer assembly 236 retains the valve trim assembly 204 and the bonnet 202 (e.g., as a subassembly). For example, the retainer 240 of the retainer assembly 236 interacts with (e.g., fastens to) the retainer interface 238 to couple the valve trim assembly 204 and the bonnet 202. Specifically, the retainer 240 attaches or joins the cage mounting interface 242 and the bonnet mounting interface 244 to (e.g., permanently, temporarily) attach the bonnet 202 and the cage 206. The retainer 240 of the illustrated example includes a first retainer 302 and a second retainer 304 that couple to the retainer interface 238 to attach the cage 206 and the bonnet 202. For example, the retainer interface 238 (e.g., the cage mounting interface 242 and/or the bonnet mounting interface 244) defines a first opening 306 to receive the first retainer 302 and a second opening 308 to receive the second retainer 304.

Referring to FIGS. 1 and 2, to assemble the cartridge 300, the first end 210a of the valve stem 210 is attached to the flow control member 208, which is the slidably positioned in the central bore 228 of the cage 206. The cage/bonnet seal 216 is positioned on a seating surface defined at the first end 206a of the cage 206 adjacent the bonnet mounting interface 244 (FIG. 2). The second end 210b of the valve stem 210 is positioned through the valve stem opening 219 of the bonnet 202 such that the bonnet mounting interface 244 of the cage 206 is moved toward and into engagement with the cage mounting interface 242 of the bonnet 202. For example, the bonnet mounting interface 244 can couple to the cage mounting interface 242 via direct engagement, an interlocking engagement, a frictional engagement, etc. When the cage mounting interface 242 is aligned with the bonnet mounting interface 244, the first retainer 302 is provided (e.g., inserted) in the first opening 306 defined by the retainer interface 238 and the second retainer 304 is provided (e.g., inserted) in the second opening 308 defined by the retainer interface 238. The retainer 240 (e.g., the first retainer 302 and/or the second retainer 304) retains the cage 206, the flow control member 208, the valve stem 210 and the cage/bonnet seal 216 coupled (e.g., attached) to the bonnet 202. The second end 210b of the valve stem 210 protrudes from the bonnet 202 and is configured to attach to an actuator.

Figure 4:
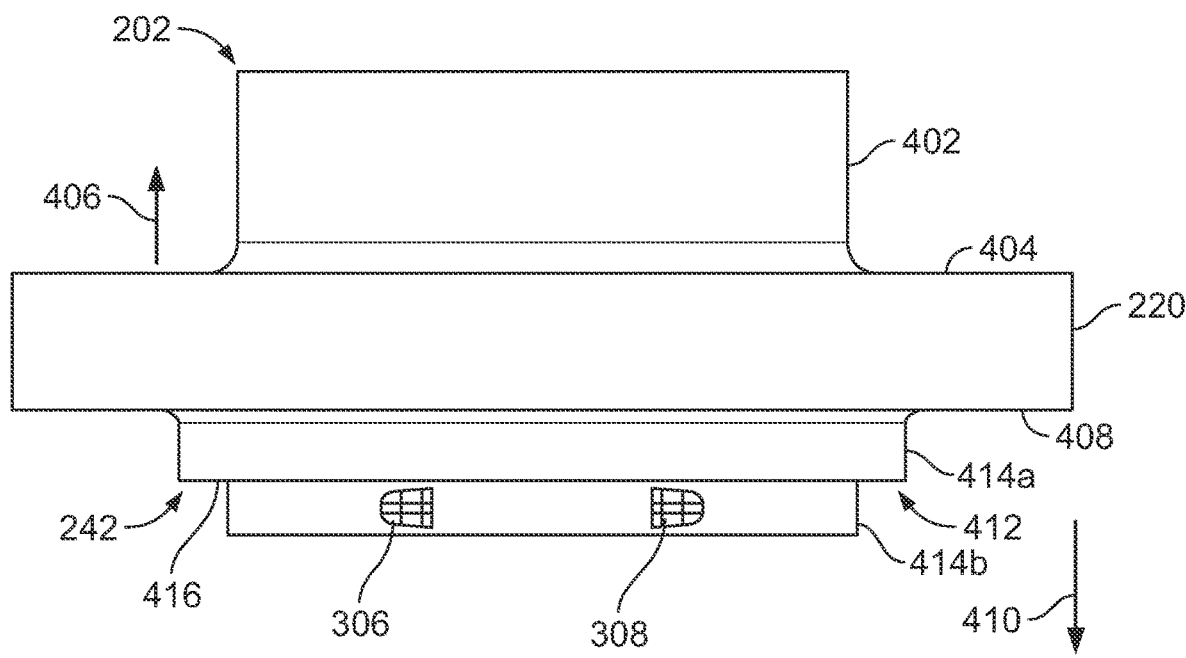
FIG. 4 is a partial, front view of an example bonnet of the example bonnet and valve trim assembly of FIGS. 1-3.

FIG. 4 is a partial, enlarged side view of the bonnet 202 of FIGS. 1-3. The bonnet 202 of the illustrated example includes a bonnet body 402 (e.g., a cylindrical body defining the valve stem opening 219 (FIG. 2, FIG. 5) to receive the valve stem 210), the mounting flange 220 and the cage mounting interface 242. The bonnet body 402 protrudes from a first surface 404 (e.g., an upper surface) of the mounting flange 220 in a first direction 406 away from the mounting flange 220 and the cage mounting interface 242 of the illustrated example protrudes from a second surface 408 (e.g., a lower surface) of the mounting flange 220 in a second direction 410 away from the mounting flange 220 that is opposite the first direction 406. In other words, the mounting flange 220 is positioned between the bonnet body 402 and the cage mounting interface 242. The cage mounting interface 242 of the illustrated example has an interface body 412 that includes a stepped profile defining a first outer wall 414a (e.g., first annular wall) and a second outer wall 414b (e.g., a second annular wall) that form a seal seat 416 (e.g., an annular wall) therebetween. For example, the second outer wall 414b has a diameter that is smaller than a diameter of the first outer wall 414a. The seal seat 416 receives (e.g., compresses) the cage/bonnet seal 216 when the bonnet 202 couples to the cage 206. The second outer wall 414b of the cage mounting interface 242 defines the first opening 306 and the second opening 308 to receive the first retainer 302 and the second retainer 304, respectively.

In some examples, the bonnet 202 and/or the cage mounting interface 242 can be manufactured or formed via an additive manufacturing process (e.g., 3D printing), casting, injection molding, machining, and/or any other suitable manufacturing process, and/or any combination thereof. Example additive manufacturing process(es) include, but are not limited to, direct metal laser sintering (DMLS), laser freeform manufacturing technology (LFMT), selective laser melting (SLM), fused deposition modeling (FDM), laser puddle deposition (LPD), small puddle deposition (SPD), laser powder bed (LPB), electron beam powder bed (EBPD), indirect power bed (IPD), laser deposition technology (LDT), laser repair technology (LRT), laser cladding technology (LCT), laser deposition welding (LDW), laser deposition welding with integrated milling (LDWM), selective laser sintering (SLS), direct metal printing (DMP), and/or stereolithography (SLA) and/or any combination.

In some examples, the bonnet 202 and the cage mounting interface 242 can be formed as a unitary piece. In some examples, the bonnet 202 and the cage mounting interface 242 can be manufactured as separate pieces coupled or jointed after formation via fasteners, welding, clamps, and/or any other suitable fasteners. For example, the bonnet body 402 and the mounting flange 220 can be manufactured via casting and/or machining and the cage mounting interface 242 can be manufactured via additive manufacturing (e.g., 3D printing). The bonnet body 402 and the cage mounting interface 242 can be coupled via fasteners, welding, and/or any other suitable fasteners.

Figure 5:
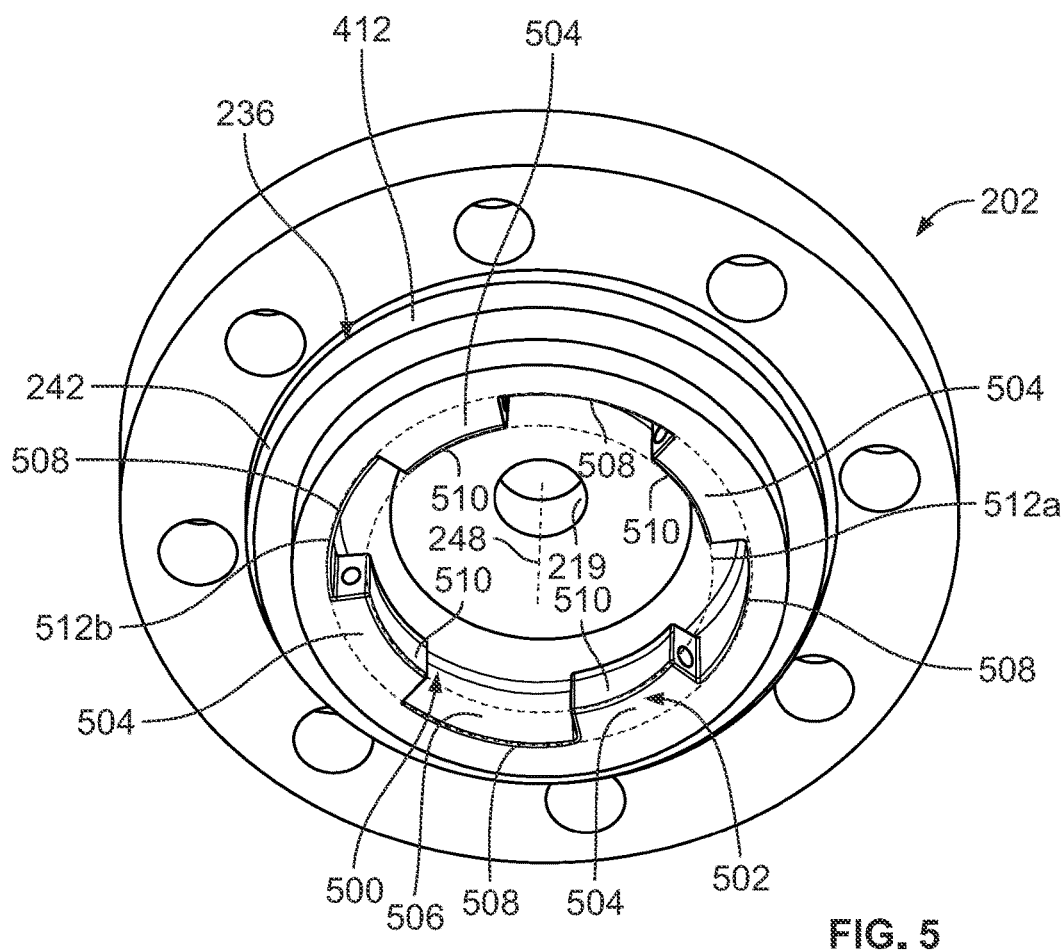
FIG. 5 is a partial, perspective view of the example bonnet of FIG. 4.

FIG. 5 is a perspective, bottom view of the bonnet 202 of FIG. 4. The interface body 412 of cage mounting interface 242 includes an inner opening 500 in communication with the valve stem opening 219 of the bonnet body 402 of the bonnet 202. The cage mounting interface 242 forms a first key 502 of the retainer assembly 236 (e.g., in the inner opening 500 of the interface body 412). The first key 502 of the illustrated example is defined by a plurality of first tabs 504 radially spaced relative to the longitudinal axis 234. The first tabs 504 are formed on an inner surface 506 of the interface body 412 defining the inner opening 500. To form the first tabs 504, the interface body 412 includes a plurality of cutouts 508. In other words, the first tabs 504 protrude form the inner surface 506 of the interface body 412 defined by the cutouts 508 toward the longitudinal axis 234. The first tabs 504 and the cutouts 508 are formed in an alternating pattern. The cage mounting interface 242 of the illustrated example has four first tabs 504 and four cutouts 508. However, in some examples, the cage mounting interface 242 can have any number of first tabs 504 and/or cutouts 508 (e.g., more than four first tabs 504 and/or cutouts 508 or less than four first tabs 504 and/or cutouts 508). Additionally, the first tabs 504 have arcuate or curved shapes. For example, innermost edges 510 of the first tabs 504 form arcuate segments of a first circle 512a. The inner surface 506 is defined by the cutouts 508, which form arcuate segments of a second circle 512b. A diameter of the first circle 512a is less than a diameter of the second circle 512b. In some examples, the first tabs 504 and/or the innermost edges 510 can have non-arcuate shapes (e.g., straight profiles, etc.) and/or any other shapes. In some examples, the cage mounting interface 242 includes a single tab (e.g., extending half way around the circumference of the cage mounting interface 242) to define the first key 502.

Figure 6:
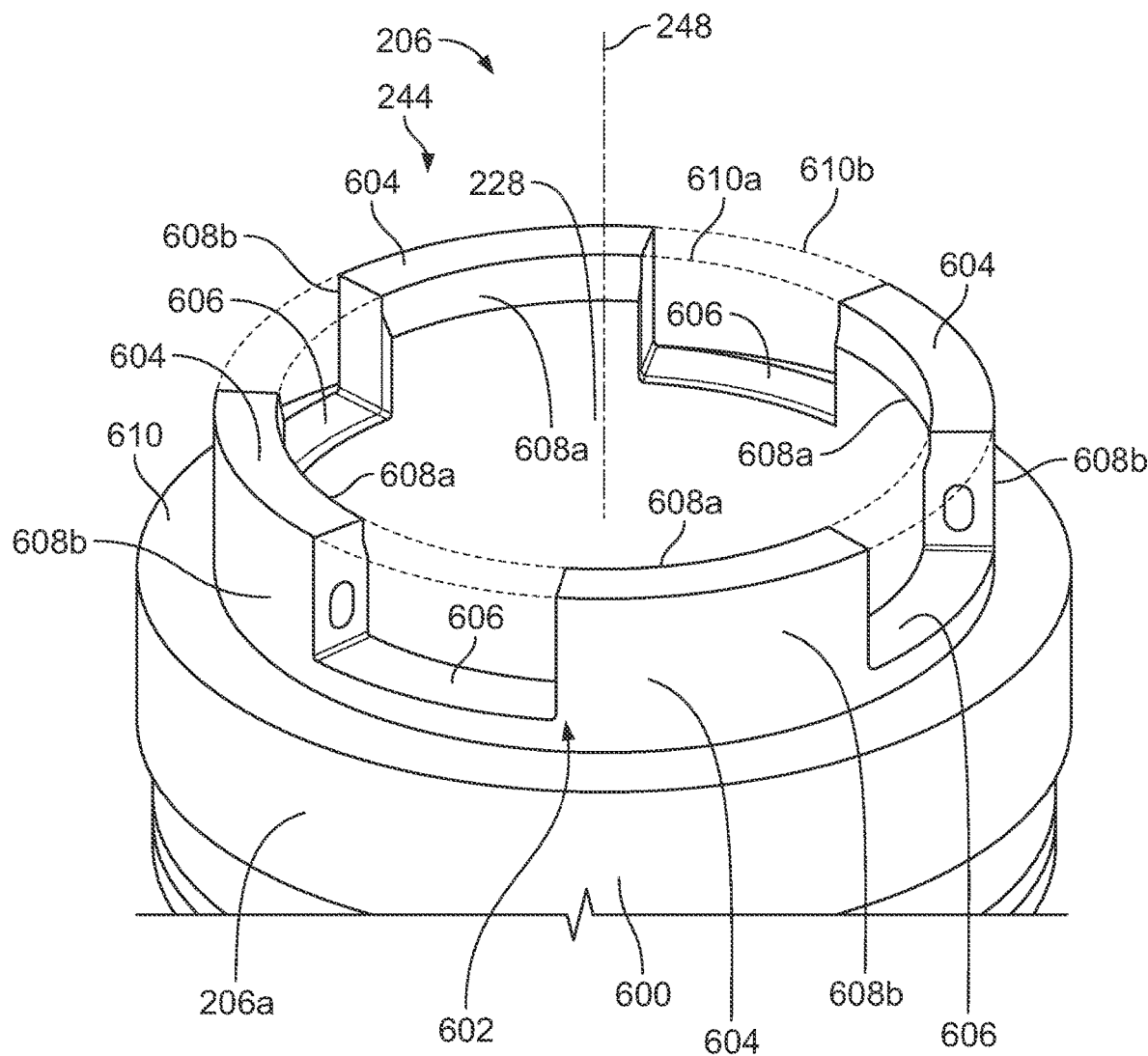
FIG. 6 is partial, perspective view of an example cage of the example bonnet and valve trim assembly of FIGS. 1-3.

FIG. 6 is a partial, perspective view of the cage 206 of FIGS. 1-3. The cage 206 of the illustrated example defines a cage body 600 defining the central bore 228 and the bonnet mounting interface 244 adjacent the first end 206a of the cage 206. The bonnet mounting interface 244 of the illustrated example defines a second key 602 of the retainer assembly 236 (e.g., adjacent the first end 206a). The second key 602 is formed adjacent the first end 206a of the cage 206 and is oriented (e.g., extends) in a direction away from the first end 206a. The second key 602 of the illustrated example is defined by a plurality of second tabs 604 radially spaced relative to the longitudinal axis 234. To form the second tabs 604, the cage 206 includes a plurality of cutouts 606. The second tabs 604 and the cutouts 606 of the illustrated example are formed in an alternating pattern around a circumference of the cage body 600. The bonnet mounting interface 244 of the illustrated example has four second tabs 604 and four cutouts 606. However, in some examples, the bonnet mounting interface 244 can have any number of second tabs 604 and/or cutouts 606 (e.g., more than four second tabs 604 and/or cutouts 606 or less than four second tabs 604 and/or cutouts 606). Additionally, the second tabs 604 have arcuate or curved shapes. For example, innermost edges 608a form arcuate segments of a first circle 610a and outermost edges 608b of the second tabs 604 form arcuate segments of a second circle 610b. The first circle 610a has a diameter that is less than a diameter of the second circle 610b. In some examples, the second tabs 604 and/or the outermost edges 608b can have non-arcuate shapes (e.g., straight profiles, etc.) and/or any other shapes. The cage body 600 and the bonnet mounting interface 244 of the illustrated example form a stepped profile to define a seal seat 612 that receives the cage/bonnet seal 216. In some examples, the bonnet mounting interface 244 includes a single tab (e.g., extending half way around the circumference of the bonnet mounting interface 244) to define the second key 602.

The cage body 600 and/or the bonnet mounting interface 244 can be manufactured or formed via an additive manufacturing process (e.g., 3D printing), casting, injection molding, machining, and/or any other suitable manufacturing process, and/or any combination thereof. Example additive manufacturing process(es) include, but are not limited to, direct metal laser sintering (DMLS), laser freeform manufacturing technology (LFMT), selective laser melting (SLM), fused deposition modeling (FDM), laser puddle deposition (LPD), small puddle deposition (SPD), laser powder bed (LPB), electron beam powder bed (EBPD), indirect power bed (IPD), laser deposition technology (LDT), laser repair technology (LRT), laser cladding technology (LCT), laser deposition welding (LDW), laser deposition welding with integrated milling (LDWM), selective laser sintering (SLS), direct metal printing (DMP), and/or stereolithography (SLA) and/or any combination.

In some examples, the cage body 600 and the bonnet mounting interface 244 can be formed as a unitary piece. In some examples, the cage body 600 and the bonnet mounting interface 244 can be manufactured as separate pieces coupled or jointed after formation via fasteners, welding, clamps, and/or any other suitable fasteners. For example, the cage body 600 can be manufactured via casting and/or machining and the bonnet mounting interface 244 can be manufactured via additive manufacturing (e.g., 3D printing). The cage body 600 and the bonnet mounting interface 244 can be coupled via fasteners, welding, and/or any other suitable fasteners.

Figure 7:
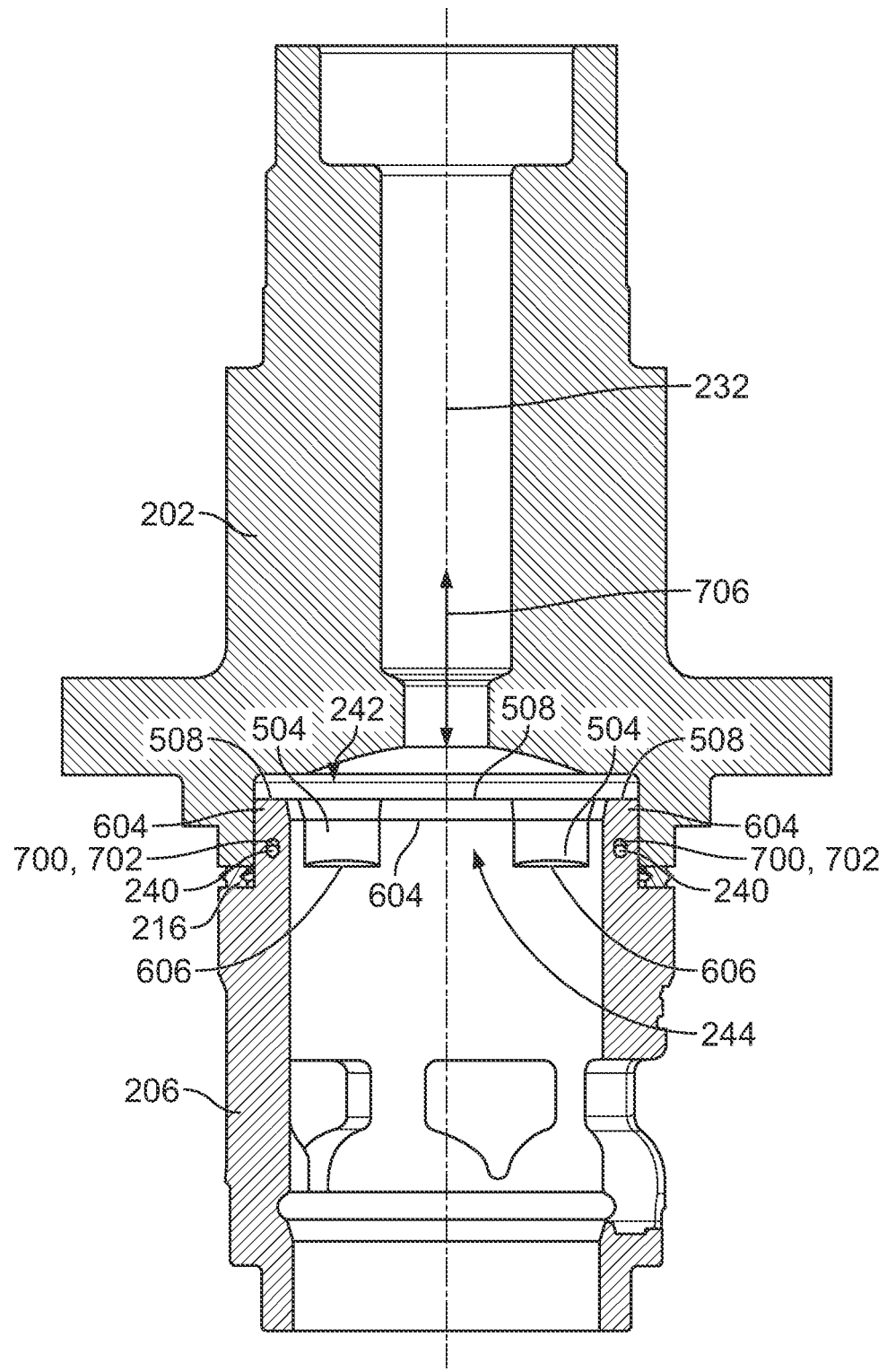
FIG. 7 is a partial, cross-sectional view of the example bonnet and valve trim assembly of FIGS. 1-6.

FIG. 7 is a cross-sectional view of the bonnet and valve trim assembly 102 of FIGS. 1-3. The flow control member 208 and the valve stem 210 are omitted from FIG. 7 for clarity. When the cage 206 is coupled to the bonnet 202, the cage mounting interface 242 couples (e.g., interacts) with the bonnet mounting interface 244. For example, the first key 502 intermeshes or engages the second key 602 to couple the bonnet 202 and the cage 206. Specifically, the cutouts 508 of the cage mounting interface 242 receive respective ones of the second tabs 604 of the bonnet mounting interface 244, and the cutouts 606 of the bonnet mounting interface 244 receive the first tabs 504 of the cage mounting interface 242. The retainer 240 retains the cage mounting interface 242 and the bonnet mounting interface 244 to couple the cage 206 and the bonnet 202 To receive the retainer 240, the retainer assembly 236 includes a passageway 700. Specifically, the passageway 700 of the illustrated example includes a first passageway 702 to receive the first retainer 302 and a second passageway 704 to receive the second retainer 304.

The cage/bonnet seal 216 is captured between the cage 206 and the bonnet 202. The cage/bonnet seal 216 of the illustrated example is a spiral wound gasket that can expand and/or contract in a rectilinear direction 706 along the longitudinal axis 234. The retainer assembly 236 enables axial movement of the cage 206 relative to the bonnet 202 in the rectilinear direction 706. For example, cage/bonnet seal 216 and/or the retainer assembly 236 enables the cage 206 to move axially relative to the bonnet 202 due to thermal expansion during operation (e.g., of the cage 206 or the bonnet mounting interface 244 and/or the bonnet 202 or the cage mounting interface 242). In some examples, cage/bonnet seal 216 and/or the retainer assembly 236 enables movement of the cage 206 relative to the bonnet 202 to accommodate manufacturing tolerances (e.g., stack-up tolerances) when the valve trim assembly 204 is positioned in the valve body 104. To enable movement of the cage 206 relative to the bonnet 202, the passageway 700 of the illustrated example has an oblong or oval cross-sectional shape (e.g., a non-circular shape) and is described in greater detail in FIGS. 12 and 13.

Figure 8:
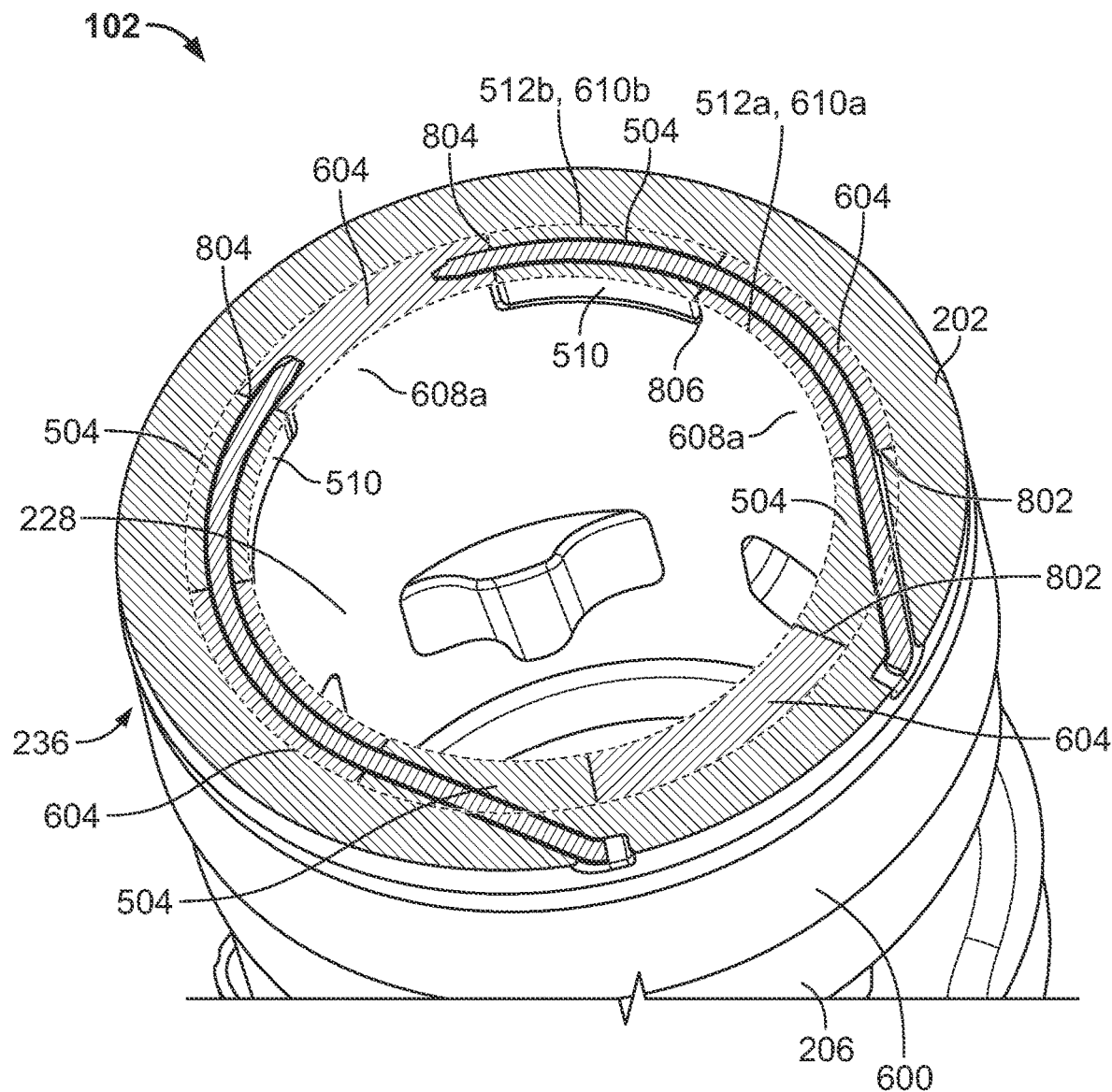
FIG. 8 is top, perspective, cross-sectional view of the example bonnet and valve trim assembly of FIGS. 1-7.

FIG. 8 is a cross-sectional, perspective view of the bonnet and valve trim assembly 102 of FIGS. 1-7 taken across the retainer assembly 236. When the cage 206 is coupled to the bonnet 202, the first tabs 504 and the second tabs 604 are positioned in an alternating pattern and form a circular shape. For example, the first tabs 504 are positioned in or received by respective ones of the cutouts 606 (FIG. 6) and the second tabs 604 are positioned in or received by respective ones of the cutouts 508 (FIG. 5) such that a respective one of the first tabs 504 is positioned between respective ones of the second tabs 604 and a respective one of the second tabs 604 is a positioned between respective ones of the first tabs 504. In this example, a gap is not formed between adjacent first tabs 504 and second tabs 604. For example, the first tabs 504 include respective lateral edges 802 and the second tabs 604 include respective lateral edges 804. As shown in FIG. 8, lateral edges 802 of a respective one of the first tabs 504 engage (e.g., directly engage or contact) the lateral edges 804 of adjacent second tabs 604. Likewise, lateral edges 804 of a respective one of the second tabs 604 engage (e.g., directly engage or contact) the lateral edges 802 of the adjacent first tabs 504. In other words, the first tabs 504 intermesh with the second tabs 604 when the cage 206 is coupled to the bonnet 202. In the illustrated example, the first tabs 504 intermesh with the second tabs 604 to form a ring. Additionally, the central bore 228 of the cage 206 has a uniform, continuous circular shape between the first end and the second end of the cage body 600. In this example, the inner surfaces 510 of the first tabs 504 and the inner surfaces 608a of the second tabs 604 define an inner surface 806 of the central bore 228 of the cage 206. In other words, the inner surfaces 510 and the inner surfaces 608a form a smooth, continuous inner surface 806 when the first tabs 504 engage the second tabs 604. In other words, the inner surfaces 510 and the inner surfaces 608a define a ring when the cage 206 is coupled to the bonnet 202. For example, the first circle 610a has a diameter that is substantially similar to (e.g., identical to or within between 0.1% and 5%) of the diameter of the first circle 512*a* of FIG. 5. The second circle 610*b* has a diameter that is substantially similar to (e.g., identical to or within between 0.1% and 5%) of the diameter of the second circle 512*b* of FIG. 5. In other words, the first tabs 504 and/or the second tabs 604 do not alter a cylindrical shape of the central bore and/or do not interfere with an operation of the flow control member 208 when the flow control member 208 moves between an open position and a closed position relative to the valve seat 212.

Figure 9:
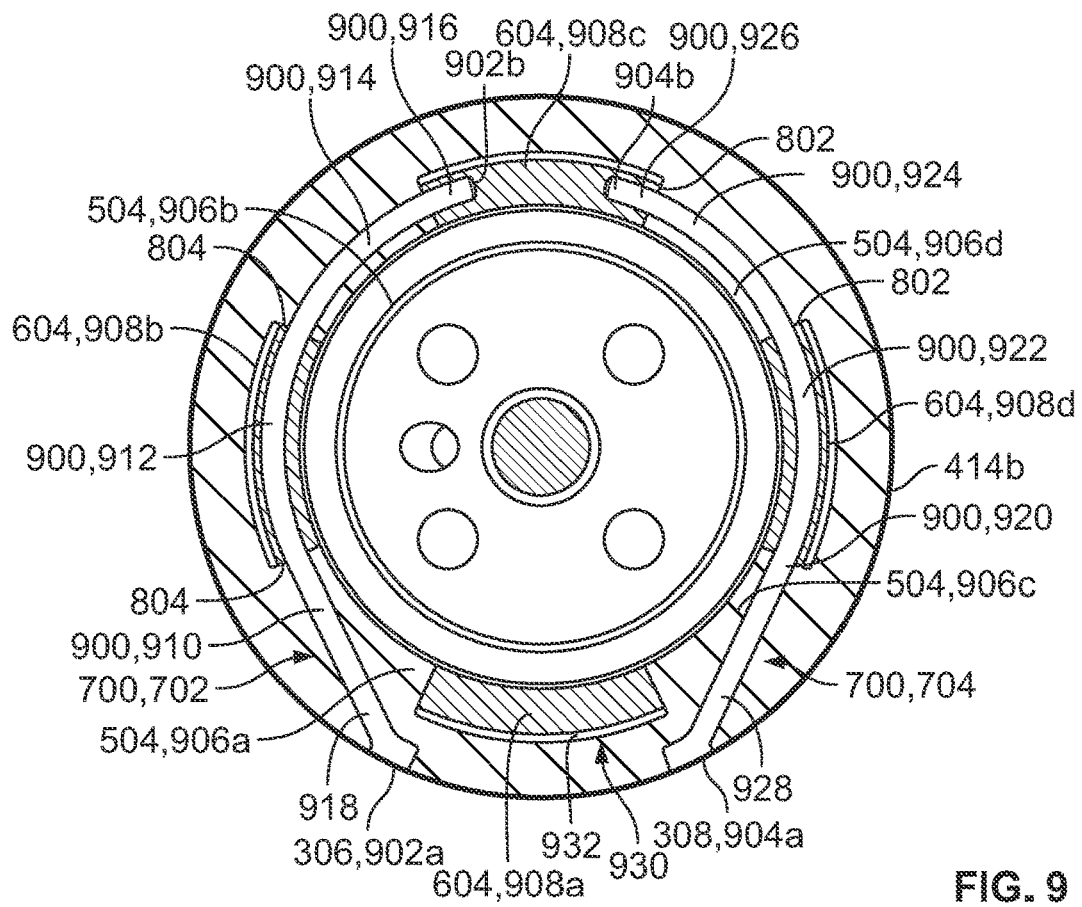
FIG. 9 is a top, cross-sectional view of the example bonnet and valve trim assembly of FIG. 8.

FIG. 9 is a top view of FIG. 8. In the illustrated example, at least portions of the first tabs 504 and/or the second tabs 604 include retainer apertures 900 to define the passageway 700. The first passageway 702 of the illustrated example has a first end 902*a* and a second end 902*b*. The first end 902*a* defines the first opening 306 formed on the outer surface of the cage mounting interface 242. The second passageway 704 has a first end 904*a* and a second end 904*b*. The first end 904*a* defines the second opening 308 formed on the outer surface of the cage mounting interface 242. The second passageway 704 of the illustrated example is a mirror image of the first passageway 702.

The first tabs 504 of the illustrated example include a first tab 906*a*, a second tab 906*b*, a third tab 906*c* and a fourth tab 906*d*, and the second tabs 604 of the illustrated example includes a fifth tab 908*a*, a sixth tab 908*b*, a seventh tab 908*c* and an eighth tab 908*d*. For example, at least portions of the first tab 906*a* and the second tab 906*b*, and at least portions of the sixth tab 908*b* and the seventh tab 908*c* define the first passageway 702. At least portions of the third tab 906*c* and the fourth tab 906*d*, and at least portions of the seventh tab 908*c* and the eighth tab 908*d* define the second passageway 704.

To form the first passageway 702, the first the first tab 906*a* of the illustrated example includes a first aperture 910, the sixth tab 908*b* includes a second aperture 912, the second tab 906*b* includes a third aperture 914, and the seventh tab 908*c* includes a fourth aperture 916. The first aperture 910 extends through a portion of the first tab 906*a* (e.g., between the lateral edges 802 of the first tab 906*a*) and the second outer wall 414*b* of the cage mounting interface 242 includes a fifth aperture 918 that couples in communication the first opening 306 and the first aperture 910 of the first tab 906*a*. The second aperture 912 is an arcuate opening or passageway that (e.g., fully) extends between the lateral edges 804 of the sixth tab 908*b*. Thus, the second aperture 912 follows an arcuate contour or shape of the sixth tab 908*b*. Similarly, the third aperture 914 is an arcuate opening or passageway that extends between the lateral edges 802 of the second tab 906*b*. Thus, the third aperture 914 follows an arcuate contour or shape of the second tab 906*b*. The fourth aperture 916 extends partially within the seventh tab 908*c*. In other words, the fourth aperture 916 (e.g., unlike the second aperture 912 and the third aperture 914) does not extend fully through the lateral edges 804 of the seventh tab 908*c*. The first aperture 910, the fourth aperture 916 and the fifth aperture 918 each has a substantially straight (e.g., linear) shape.

Likewise, to form the second passageway 704, the third tab 906*c* of the illustrated example includes a sixth aperture 920, the eighth tab 908*d* includes a seventh aperture 922, the fourth tab 906*d* includes an eighth aperture 924, and the seventh tab 908*c* includes a ninth aperture 926. The sixth aperture 920 extends through a portion of the third tab 906*c* (e.g., between the lateral edges 802 of the third tab 906*c*) and the second outer wall 414*b* of the cage mounting interface 242 includes a tenth aperture 928 that couples the second opening 308 and the sixth aperture 920 of the third tab 906*c*. The seventh aperture 922 is an arcuate opening or passageway that (e.g., fully) extends between the lateral edges 804 of the eighth tab 908*d*. Thus, the seventh aperture 922 follows an arcuate contour or shape of the eighth tab 908*d*. Similarly, the eighth aperture 924 is an arcuate opening or passageway that extends between the lateral edges 802 of the fourth tab 906*d*. Thus, the eighth aperture 924 follows an arcuate contour or shape of the fourth tab 906*d*. The ninth aperture 926 extends partially within the seventh tab 908*c*. In other words, the ninth aperture 926 (e.g., unlike the seventh aperture 922 and the eighth aperture 924) does not extend fully through the lateral edges 804 of the seventh tab 908*c*. The sixth aperture 920, the ninth aperture 926 and the tenth aperture 928 each has a substantially straight (e.g., linear) shape.

When the first tabs 504 are interlocked with the second tabs 604, the first aperture 910 aligns with the second aperture 912, the second aperture 912 aligns with the third aperture 914, and the third aperture aligns with the fourth aperture 916. In other words, the second aperture 912 is positioned between and couples the first aperture 910 and the third aperture 914, and the third aperture 914 is positioned between and couples the second aperture 912 and the fourth aperture 916. Similarly, the sixth aperture 920 aligns with the seventh aperture 922, the seventh aperture 922 aligns with the eighth aperture 924, and the eighth aperture 924 aligns with the ninth aperture 926. In other words, the seventh aperture 922 is positioned between and couples the sixth aperture 920 and the eighth aperture 924, and the eighth aperture 924 is positioned between and couples the seventh aperture 922 and the ninth aperture 926.

To properly align the apertures 910-928, the retainer assembly 236 of the illustrated example includes a third key 930 (e.g., an orientation key). The third key 930 of the illustrated example is provided by the fifth tab 908*a* and/or a cutout 932 positioned between the first opening 306 and the second opening 308. Specifically, the fifth tab 908*a* of the illustrated example does not include a retainer aperture (e.g., the retainer aperture 900). To align the apertures 910-928, the fifth tab 908*a* is oriented toward the first opening 306 and the second opening 308. For example, to align the retainer apertures 900, the fifth tab 908*a* is located within the cutout 932 of the cage mounting interface 242 that is formed between the first opening 306 and the second opening 308. Thus, the third key 930 facilitates assembly of the cage 206 and the bonnet 202 and/or clocking of the cage 206 relative to the bonnet 202. In some examples, the fifth tab 908*a* and the cutout 932 can have a different size (e.g., a larger size) relative to the other tabs 906*a*-906*d* and 908*b*-908*d* to facilitate proper orientation of the cage 206 relative to the bonnet 202 to align the retainer apertures 900.

In some examples, the passageway 700 forms a single, continuous passageway between the first opening 306 and the second opening 308. In some such examples, the retainer 240 includes a single, continuous retainer wire that is received by the single, continuous passageway. In some such examples, the bonnet and valve trim assembly 102 includes only the first opening 306 to receive the single, continuous retainer wire.

Figure 10:
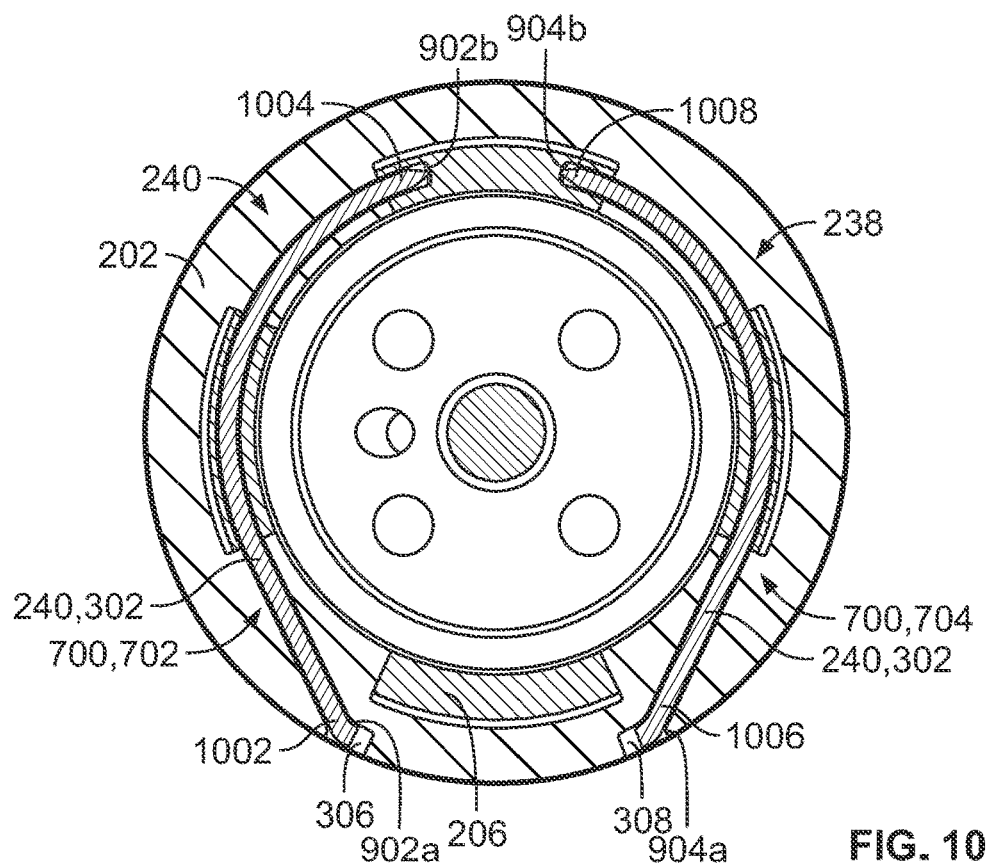
FIG. 10 is a top, cross-sectional view of the example bonnet and valve trim assembly of FIG. 9, but showing an example retainer of the example bonnet and valve trim assembly disclosed herein.

FIG. 10 is a top view of FIG. 8 but showing the retainer 240 coupled to the passageway 700. Specifically, the retainer 240 attaches or joins the cage mounting interface 242 and the bonnet mounting interface 244 to (e.g., permanently, temporarily) attach the bonnet 202 and the cage 206. In other words, when the apertures 910-918 (FIG. 9) are in alignment (e.g., facilitated by the third key 930 (FIG. 9), the passageway 700 can receive the retainer 240.

In the illustrated example, the first retainer 302 is positioned in the first passageway 702. The first retainer 302 of the illustrated example extends between the first end 902a and the second end 902b of the first passageway 702. For example, the first retainer 302 has a first end 1002 and a second end 1004. The first end 1002 is positioned adjacent the first end 902a of the first passageway 702 and the second end 1004 is positioned adjacent the second end 902b of the first passageway 702. The apertures 912-918 (FIG. 9) guide the first retainer 302 in the first passageway 702. The first retainer 302 is flexible and can conform (e.g., bend or flex) to the shape of the first passageway 702 defined by the apertures 912-918. The first end 1002 can be cut after the first retainer 302 (e.g., a wire) is inserted or positioned within the first passageway 702.

In the illustrated example, the second retainer 304 is positioned in the second passageway 704. The second retainer 304 of the illustrated example extends between the first end 904a and the second end 904b of the second passageway 704. For example, the second retainer 304 has a first end 1006 and a second end 1008. The first end 1006 is positioned adjacent the first end 904a of the second passageway 704 and the second end 1008 is positioned adjacent the second end 904b of the second passageway 704. The apertures 922-928 (FIG. 9) guide the second retainer 304 in the second passageway 704. The second retainer 304 is flexible and can conform (e.g., bend or flex) to the shape of the second passageway 704 defined by the apertures 922-928. The first end 1006 can be cut after the second retainer 304 (e.g., a wire) is inserted or positioned within the second passageway 704.

The first retainer 302 and the second retainer 304 retain the cage 206 coupled to the bonnet 202. The first retainer 302 and the second retainer 304 can permanently or temporarily couple to the cage 206 and the bonnet 202. In some examples, a weld can be provided to cover (e.g., enclose) the first opening 306 and/or the second opening 308 to enclose (e.g., trap) the first retainer 302 in the first passageway 702 and/or the second retainer 304 in the second passageway 704.

Figure 11:
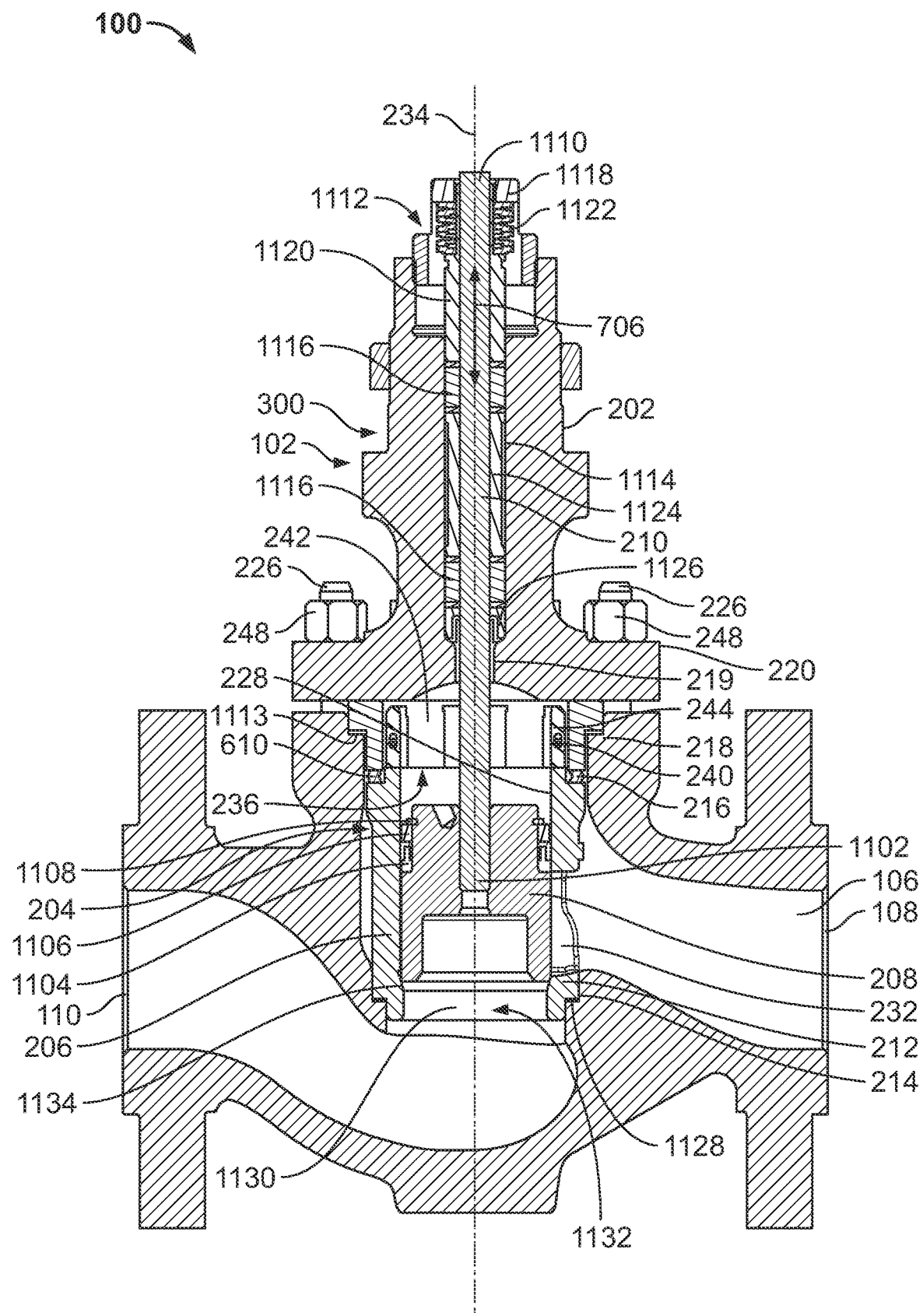
FIG. 11 is a cross-sectional view of the example control valve of FIGS. 1 and 2.

FIG. 11 is a cross-sectional view of the fluid valve 100 of FIG. 1. To couple the valve trim assembly 204 within the fluid flow passageway 106 of the valve body 104, the cartridge 300 is coupled to the valve body 104. In other words, the valve trim assembly 204 may be coupled to and/or removed from the valve body 204 as a unitary structure (e.g., together or simultaneously) with the coupling and/or removal of the bonnet 202 and the valve body 104.

As noted in FIG. 3, the assembled cartridge 300 is a pre-assembled unit (e.g., a subassembly) that removes and/or couples to the valve body 104 as a unitary unit. To assemble the cartridge 300, a first end 1102 of the valve stem 210 is attached (e.g., fastened, welded, threaded, etc.) to the flow control member 208. A piston seal 1104, a piston ring 1106 and a piston ring retainer 1108 are coupled to the flow control member 208 and the flow control member 208 is positioned in the central bore 228 of the cage 206. The cage/bonnet seal 216 is then positioned on the seal seat 610 defined by the cage 206. A second end 1110 of the valve stem 210 is positioned in the stem bore 219 of the bonnet 202. The cage 206 is then oriented (e.g., rotated if needed) to align the fifth tab 908a and the cutout 932 of the third key 930 (see FIG. 9) and the cage 206 is moved toward the bonnet 202 to cause the bonnet mounting interface 244 to engage with the cage mounting interface 242. In other words, the second tabs 604 engage respective ones of the other cutouts 508 (with the fifth tab 908a engaging the cutout 932) and the first tabs 504 engage respective ones of the cutouts 606. With the passageway 700 aligned, the retainer 240 is inserted in the passageway 700 to retain (e.g., couple, attach or fasten) the cage 206 and the bonnet 202. The bonnet 202 is then coupled to the cage 206 via the retainer 240. The second end 1110 of the valve stem 210 protrudes from the valve stem bore 219 of the bonnet 202 and can be configured to engage an actuator. A packing assembly 1112 is positioned in a packing bore 1114 of the bonnet 202. The packing assembly 1112 includes one or more packing seals 1116 that prevent or restrict leakage of fluid to the environment via the valve stem bore 219. The packing assembly 1112 includes a packing adjustor 1118, a packing follower 1120 and a biasing element 1122 (e.g., wave spring stack) to adjust or vary (e.g., increase or decrease) a packing force on the packing seals 1116. A bearing 1124 and/or a bushing 1126 can be included in the valve stem bore 219 to align the valve stem 210 (e.g., relative to vertical) and/or facilitate movement of the valve stem 210 relative to the bonnet 202 in the rectilinear direction 706. The bonnet/valve body seal 218 is then coupled to the bonnet 202 and the cage/valve body seal 214 is coupled to the cage 206 via adhesive.

Alternatively, the packing assembly 1112, the bushing 1126 and/or bearing 1124 can be coupled to the cartridge 300 after the bonnet 202 is coupled to the valve body 104. In some examples, the bonnet/valve body seal 218 and/or the cage/valve body seal 214 are not part of the cartridge 300 and can be coupled to the valve body 104 prior to coupling the cartridge 300 to the valve body 104.

After the cartridge 300 is assembled, the bonnet 202 is attached to the valve body 104. The bonnet 202 removably couples to the valve body 104 via the fasteners 226 (e.g., studs and/or threaded fasteners) and the nuts 248. When the bonnet 202 and/or, more generally, the bonnet and valve trim assembly 102 is coupled to the valve body 104 (e.g., as shown in FIG. 11), the cage 206 and the integral valve seat 212 of the valve trim assembly 204 are positioned within the valve body bore 246 (e.g., the fluid flow passageway 106) of the valve body 104 such that the cage 206 engages a first annular wall 1128 (e.g., a shoulder or stepped surface) of the valve body 104. The cage/valve body seal 214 is positioned between the first annular wall 1128 and the cage 206 to prevent process fluid from leaking between the cage 206 (e.g., an outer surface of the cage 206 and/or valve seat 212) and the valve body 104. In some examples, the cage/valve body seal 214 can be a spring-loaded and/or spring-energized seal. In other examples, the cage/valve body seal 214 can be a metallic c-seal or other type of resilient metal seal. The bonnet/valve body seal 218 is positioned between a second annular wall 1113 (e.g., a shoulder or stepped surface) of the valve body 104 and the bonnet 202 and prevents or restricts leakage of fluid between bonnet 202 and the valve body 104 via the valve body bore 246.

When coupled to the valve body 104, the cage 206 is positioned between the bonnet 202 and the first annular wall 1128. A force (e.g., a clamping force) imparted to the cage can be adjusted via the nuts 248. Specifically, the cage mounting interface 242 imparts a force to the cage/bonnet seal 216, which imparts a force to the cage 206. As described in greater detail in FIGS. 12 and 13, the cage/bonnet seal 216 is a spring seal that allows movement of the cage 206 relative to the bonnet 202 and the retainer assembly 236 enables movement of the cage 206 relative to the bonnet 202 in the rectilinear direction 706 to accommodate for thermal expansion and/or manufacturing tolerances.

When the bonnet 202 couples to the valve body 104, the bonnet and valve trim assembly 102 locates the valve trim assembly 204 in the fluid flow passageway 106 such that the valve seat 212 defines an orifice 1130 of the fluid flow passageway 106. To control fluid flow through the orifice 1130, the actuator moves the flow control member 208 between a closed position 1132 (e.g., a fully closed position as shown in FIG. 11) at which the flow control member 208 sealingly engages a sealing surface 1134 (e.g., a lip) of the valve seat 212 to prevent fluid flow through the fluid flow passageway 106 and a second position or an open position at which the flow control member 208 disengages from the sealing surface 1134 of the valve seat 212 to allow fluid flow through the fluid flow passageway 106 via the orifice 1130. The cage 206 guides the flow control member 208 (e.g., a valve plug) when the flow control member moves between the open position and the closed position 1132.

In the open position, the valve trim assembly 204 of the illustrated example enables fluid to flow through fluid flow passageway 106 between the inlet 108 and the outlet 110. Specifically, fluid flows through one or more windows or openings 232 provided by the cage 206 that fluidly couple the inlet 108 and the outlet 110. The openings 232 of the cage 206 affect fluid flow to provide a fluid flow characteristic to fluid flowing through the fluid flow passageway 106. The flow characteristic provided by the cage 206 of the illustrated is based on a dimensional size and/or geometric shape of (e.g., a flow path through) of the openings 232. The flow characteristics can be, for example, a linear flow characteristic, an equal-percentage flow characteristic, and/or any other fluid flow characteristic. For example, the valve trim assembly 204 disclosed herein can provide an equal-percentage flow characteristic. To provide the fluid valve 100 with a linear flow characteristic or any other fluid flow characteristic, the cartridge 300 can be removed from the valve body 104 and another cartridge (e.g., substantially similar to the cartridge 300) having a cage that include different openings (e.g., different sized and/or different shaped apertures or channels radially spaced around a circumference of the cage different than the openings 232) can be coupled to the valve body 104. The cartridge 300 facilitates disassembly (e.g., removal) of the valve trim assembly 204 from the valve body 104 and/or facilitates assembly (e.g., attachment) of a valve trim assembly to the valve body 104.

Figure 12:
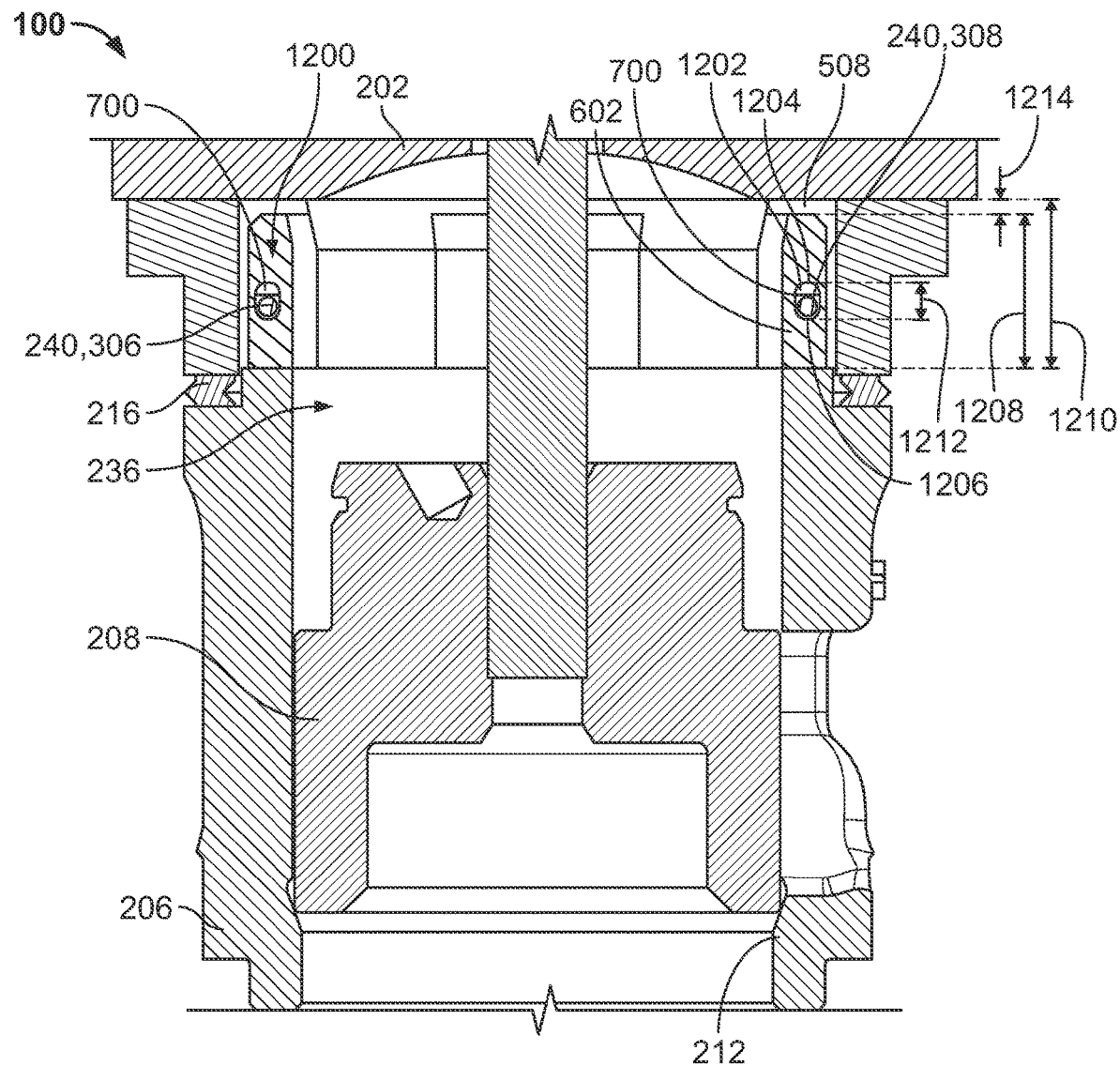
FIG. 12 is an enlarged, partial cross-sectional view of the example bonnet and valve trim assembly of FIG. 11 showing the example retainer in an example first position.

FIG. 12 is an enlarged, partial cross-sectional view of the valve trim assembly of FIG. 14 showing the retainer assembly 236 in a first position 1200. As noted above, the retainer assembly 236 enables rectilinear movement along the longitudinal axis 234. To enable movement of the cage 206 relative to the bonnet 202 in the rectilinear direction along the longitudinal axis 234, the passageway 700 has a passageway opening 1202 having an oval or oblong cross-sectional shape. The retainer 240 (e.g., the first retainer 302 and the second retainer 304) has a circular cross-sectional shape. In other words, a diameter of the retainer 240 is smaller than a dimension of the passageway opening 1202 of the passageway 700 to enable a bi-directional movement of the retainer 240 in the passageway 700. For example, the retainer 240 can move in a first direction along a longitudinal axis (see FIG. 9) of the passageway 700 and a second direction that is non-parallel (e.g. perpendicular to) the longitudinal axis of the passageway 700. The passageway opening 1202 of the passageway 700 has a first end 1204 (e.g., an upper end) and a second end 1206 (e.g., a lower end) that define a first travel limit of the cage 206 (e.g., in the rectilinear direction) relative to the bonnet 202 and a second travel limit of the cage 206 (e.g., in the rectilinear direction) relative to the bonnet 202, respectively. To allow movement of the cage 206 relative to the bonnet 202, the second tabs 604 of the illustrated example have a tab length 1208 that is less than a cutout length 1210 of the cutouts 508 of the cage mounting interface 242. For example, a difference 1212 between the cutout length 1210 and the tab length 1208 is substantially equal to or greater than an opening length 1214 between the first end 1204 and the second end 1206 of the passageway 700. Additionally, the cage/bonnet seal 216 is a spring seal that flexes to enable the cage 206 to move relative to the bonnet 202. As shown in FIG. 12, the retainer 240 engages the second end 1206 of the passageway opening 1202 of the passageway 700 when the retainer assembly 236 in the first position 1200.

Figure 13:
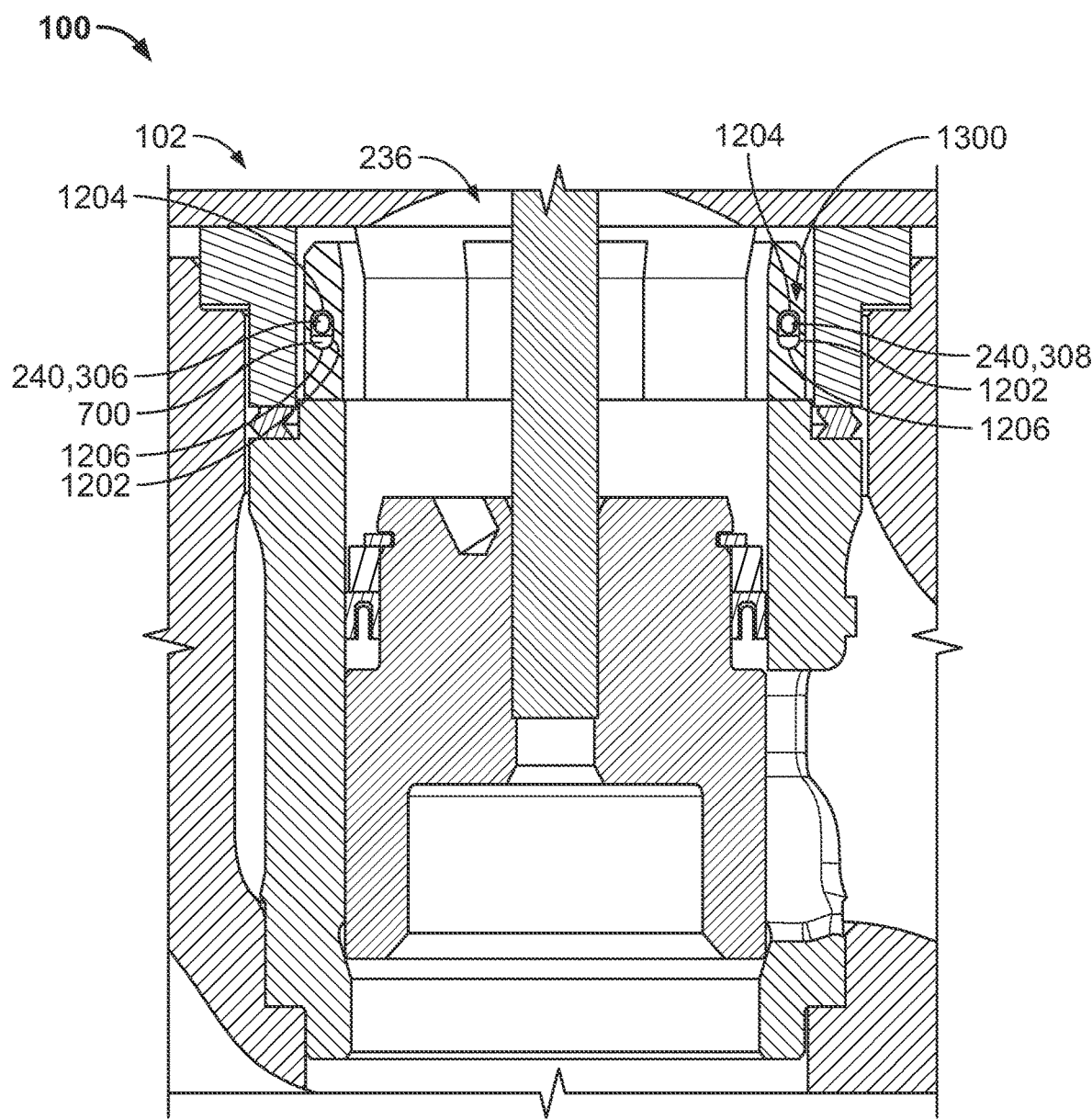
FIG. 13 is an enlarged, partial cross-sectional view of the example bonnet and valve trim assembly of FIG. 11 showing the example retainer in an example second position.

FIG. 13 is an enlarged, partial cross-sectional view of the valve trim assembly of FIG. 12 showing the retainer assembly 236 in a second position 1300. As shown in FIG. 13, the retainer 240 engages the first end 1204 of the passageway opening 1202 of the passageway 700 when the retainer assembly 236 in the second position 1300. The retainer assembly 236 of the illustrated example enables movement of the cage 206 relative to the bonnet 202 via the retainer 240, the passageway 700 and/or the cage/bonnet seal 216.

From the foregoing, the example bonnet and valve trim assembly 102 provides a cartridge 300 that removably couples from the valve body 104 as a single piece or unit. The cartridge 300 facilitates assembly, disassembly and serviceability of the fluid valve 100. For example, during disassembly, the retainer 240 retains the valve trim assembly 204 coupled to the bonnet 202, and removal of the bonnet 202 from the valve body 104 causes removal of the valve trim assembly 204 from the valve body 104. Additionally, the retainer assembly 236 provides a joint (e.g., a non-rigid joint) that couples the cage 206 and the bonnet 202 and that allows for axial movement to enable the cage/bonnet seal 216 (e.g., a spiral wound gasket) to account for thermal expansion while in operation. The retainer assembly 236 also includes a key feature to enable clocking (e.g., orientating) the cage 206 relative to the bonnet 202. The retainer assembly 236 (e.g., the passageway 700, the cage mounting interface 242 and/or the bonnet mounting interface 244) can be manufactured via additive manufacturing techniques, casting, molding, and/or any other manufacturing process.

Bonnet and valve trim assemblies are disclosed herein. Further examples and combinations thereof include the following:

In some examples, an example bonnet and valve trim assembly includes a bonnet structured to couple to a valve body via a valve body mounting flange, the bonnet including a cage mounting interface. A cage defining a body has a bonnet mounting interface to couple to the cage mounting interface of the bonnet. A retainer retains the cage mounting interface and the bonnet mounting interface to couple the cage and the bonnet. The retainer to enable axial movement between the cage and the bonnet when the retainer is coupled to the cage and the bonnet.

In some examples, a valve seat is coupled to the cage.

In some examples, the valve seat is integrally formed with the cage.

In some examples, a valve plug positioned in a cage bore defined by the body of the cage, wherein the cage bore is to slidably receive a valve plug, and including a valve stem coupled to the valve plug, the valve stem to be slidably received by a valve stem bore defined by the bonnet.

In some examples, the cage mounting interface of the bonnet is located inside a perimeter of the valve body mounting flange.

In some examples, the cage mounting interface of the bonnet includes a first opening and the bonnet mounting interface of the cage includes a second opening to receive the retainer.

In some examples, an example bonnet and valve trim assembly includes a bonnet having first tabs radially spaced relative to a longitudinal axis of the bonnet. A cage has second tabs radially spaced relative to a longitudinal axis of the cage. The first tabs are to intermesh with the second tabs when the cage is coupled to the bonnet. A fastener is to couple the first tabs and the second tabs to retain the cage coupled to the bonnet.

In some examples, the first tabs and the second tabs are to intermesh to form a ring when the cage is coupled to the bonnet.

In some examples, the first tabs and the second tabs have arcuate profiles to define the ring when the cage is coupled to the bonnet.

In some examples, each of the first tabs includes a first opening to receive fastener and each of the second tabs includes a second opening to receive the fastener, the first opening of a first one of the first tabs to align with the second opening of a first one of the second tabs adjacent the first one of the first tabs.

In some examples, the first openings and the second openings each have an oblong cross-sectional shape.

In some examples, a seal positioned between the cage and the bonnet.

In some examples, the first openings, the second openings and the seal enable the cage to move in a direction along the longitudinal axis of the cage to accommodate at least one of thermal expansion or tolerance stack-up.

In some examples, a valve plug and a valve stem coupled to the valve plug, the valve plug to slide relative to the cage and the valve stem to slide relative to the bonnet when the cage is coupled to the bonnet.

In some examples, the second tabs of the cage are positioned adjacent a first end of the cage and a valve seat is coupled to a second end of the cage opposite the first end.

In some examples, the bonnet and the valve trim assembly provides a cartridge to enable the bonnet and valve trim assembly to removably couple to a valve body as a single unit.

In some examples, an example method includes obtaining a bonnet with a cage mounting flange; obtaining a cage with a bonnet mounting flange; and coupling the bonnet and the cage via a retainer by inserting the retainer in a passageway defined by the cage mounting flange and the bonnet mounting flange.

In some examples, the method includes positioning a seal between the cage mounting flange and the bonnet mounting flange prior to coupling the bonnet and the cage via the retainer.

In some examples, the method includes positioning a valve plug in a bore of the cage, positioning a valve stem in a bore of the bonnet, and attaching an end of the valve stem and the valve plug prior to coupling the bonnet and the cage via the retainer.

In some examples, the method includes mounting the bonnet to a valve body via a flange of the bonnet, wherein the mounting of the bonnet to the valve body positions the cage and the valve plug in a fluid flow passageway of the valve body.

Although certain apparatus, methods and articles of manufacture have been described herein, the scope of coverage of this patent is not limited thereto. To the contrary, this patent covers all apparatus, methods and articles of manufacture fairly falling within the scope of the appended claims either literally or under the doctrine of equivalents.

What is claimed is:

1. A bonnet and valve trim assembly comprising:
a bonnet structured to couple to a valve body via a valve body mounting flange, the bonnet including a cage mounting interface;
a cage defining a body having a bonnet mounting interface to couple to-the cage mounting interface of the bonnet; and
a wire coupled to the cage mounting interface and the bonnet mounting interface to retain the cage mounting interface and the bonnet mounting interface and couple the cage and the bonnet, the wire to enable axial movement between the cage and the bonnet when the wire is coupled to the cage and the bonnet.

2. The assembly as defined in claim 1, further including a valve seat coupled to the cage.

3. The assembly as defined in claim 2, wherein the valve seat is integrally formed with the cage.

4. The assembly as defined in claim 1, further including a valve plug positioned in a cage bore defined by the body of the cage, wherein the cage bore is to slidably receive the valve plug, and including a valve stem coupled to the valve plug, the valve stem to be slidably received by a valve stem bore defined by the bonnet.

5. The assembly as defined in claim 1, wherein the cage mounting interface of the bonnet is located inside a perimeter of the valve body mounting flange.

6. The assembly as defined in claim 1, wherein the cage mounting interface of the bonnet includes a first opening and the bonnet mounting interface of the cage includes a second opening to receive the wire.

7. The apparatus of claim 1, wherein the bonnet mounting interface intermeshes with the cage mounting interface.

8. The apparatus of claim 1, wherein the wire that is insertable into a first opening of the cage mounting interface and a second opening of the bonnet mounting interface.

9. The apparatus of claim 1, wherein the cage mounting interface is formed by a first cutout, and wherein the bonnet mounting interface is formed by a second cutout, wherein at least a portion of the first cutout receives at least a portion of the bonnet mounting interface and at least a portion of the second cutout receives at least a portion of the cage mounting interface when the bonnet is coupled to the cage.

10. The apparatus of claim 1, wherein the cage mounting interface is a first tab and the bonnet mounting interface is a second tab, wherein the first tab intermeshes with the second tab.

11. A bonnet and valve trim assembly comprising:
a bonnet having first tabs radially spaced relative to a longitudinal axis of the bonnet; and
a cage having second tabs radially spaced relative to a longitudinal axis of the cage, the first tabs to intermesh with the second tabs when the cage is coupled to the bonnet; and
a fastener to couple the first tabs and the second tabs to retain the cage coupled to the bonnet.

12. The assembly as defined in claim 11, wherein the first tabs and the second tabs are to intermesh to form a ring when the cage is coupled to the bonnet.

13. The assembly as defined in claim 12, wherein the first tabs and the second tabs have arcuate profiles to define the ring when the cage is coupled to the bonnet.

14. The assembly as defined in claim 11, wherein each of the first tabs includes a first opening to receive the fastener and each of the second tabs includes a second opening to receive the fastener, the first opening of a first one of the first tabs to align with the second opening of a first one of the second tabs adjacent the first one of the first tabs.

15. The assembly as defined by claim 14, wherein the first openings and the second openings each have an oblong cross-sectional shape.

16. The assembly as defined in claim 15, further including a seal positioned between the cage and the bonnet.

17. The assembly as defined in claim 16, wherein the first openings, the second openings and the seal enable the cage to move in a direction along the longitudinal axis of the cage to accommodate at least one of thermal expansion or tolerance stack-up.

18. The assembly as defined in claim 11, further including a valve plug and a valve stem coupled to the valve plug, the valve plug to slide relative to the cage and the valve stem to slide relative to the bonnet when the cage is coupled to the bonnet.

19. The assembly as defined in claim 18, wherein the second tabs of the cage are positioned adjacent a first end of the cage and a valve seat is coupled to a second end of the cage opposite the first end.

20. The assembly as defined in claim 11, wherein the bonnet and the valve trim assembly provides a cartridge to enable the bonnet and valve trim assembly to removably couple to a valve body as a single unit.

21. A method comprising:
obtaining a bonnet with a cage mounting flange;
obtaining a cage with a bonnet mounting flange; and
coupling the bonnet and the cage via a wire by inserting the wire in a passageway defined by a first opening of the cage mounting flange and a second opening defined by the bonnet mounting flange.

22. The method as defined in claim 21, further including positioning a seal between the cage mounting flange and the bonnet mounting flange prior to coupling the bonnet and the cage via the wire.

23. The method as defined in claim 22, further including positioning a valve plug in a bore of the cage, positioning a valve stem in a bore of the bonnet, and attaching an end of the valve stem and the valve plug prior to coupling the bonnet and the cage via the wire.

24. The method as defined in claim 23, further including mounting the bonnet to a valve body via a flange of the bonnet, wherein the mounting of the bonnet to the valve body positions the cage and the valve plug in a fluid flow passageway of the valve body.

* * * * *